US009965754B2

(12) United States Patent
Thrope et al.

(10) Patent No.: US 9,965,754 B2
(45) Date of Patent: May 8, 2018

(54) POINT OF SALE TERMINAL GEOLOCATION

(71) Applicant: GOOGLE INC., Mountain View, CA (US)

(72) Inventors: Glenn Thrope, New York, NY (US); Xiaohang Wang, Jersey City, NJ (US); Glenn Berntson, Jersey City, NJ (US); Harry Lee Butler, IV, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

(21) Appl. No.: 14/733,917

(22) Filed: Jun. 8, 2015

(65) Prior Publication Data
US 2016/0358144 A1    Dec. 8, 2016

(51) Int. Cl.
*G06Q 20/00*   (2012.01)
*G06Q 20/20*   (2012.01)
(Continued)

(52) U.S. Cl.
CPC ........... *G06Q 20/204* (2013.01); *G01C 21/00* (2013.01); *G01C 21/32* (2013.01); *G06N 3/02* (2013.01);
(Continued)

(58) Field of Classification Search
CPC ........ G06Q 30/02; G06Q 20/36; G06Q 20/20; G06F 3/048
(Continued)

(56) References Cited

U.S. PATENT DOCUMENTS 8,078,152 B2   12/2011   Partridge et al.
8,255,284 B1 *  8/2012   Ramalingam ......... G06Q 20/10
                                                705/26.1
(Continued)

FOREIGN PATENT DOCUMENTS

WO   2016/200563 A1   12/2016
WO   2016/200563 A8    1/2017

OTHER PUBLICATIONS

Berthon, "International Search Report and Written Opinion issued in International Application No. PCT/US2016/032801", dated Jul. 19, 2016, 11 pages.
(Continued)

*Primary Examiner* — Oluseye Iwarere
(74) *Attorney, Agent, or Firm* — Johnson, Marcou & Isaacs, LLC

(57) ABSTRACT

Identifying the geolocation of POS terminals using non-payment events to predict when the geolocation of a computing device at a time when the device detects events corresponds to the geolocation of the terminal. The device monitors for pre-selected events and transmit data to the account system. The account system determines a frequency of the events and it reaches a pre-defined threshold, the account system identifies the location of the terminal by identifying the common geolocation of the events. The identified geolocation is saved so that when a user then enters the location and transmits event data to the account system, the system can compare the geolocation of the event data to the saved geolocation to determine whether the computing device is located at the terminal. If the computing device is located at the terminal, the account system transmits offers or other content for display and use at the identified terminal.

24 Claims, 6 Drawing Sheets

(51) Int. Cl.
- *G01C 21/00* (2006.01)
- *H04W 4/02* (2018.01)
- *G06N 3/02* (2006.01)
- *G01C 21/32* (2006.01)
- *G06Q 30/02* (2012.01)
- *H04W 4/00* (2018.01)
- *G06Q 30/00* (2012.01)

(52) U.S. Cl.
CPC ........ *G06Q 30/0261* (2013.01); *H04W 4/006* (2013.01); *H04W 4/008* (2013.01); *H04W 4/028* (2013.01); *H04W 4/027* (2013.01)

(58) Field of Classification Search
USPC .............. 705/14.33, 41, 14.35; 715/771; 1/1
See application file for complete search history.

(56) References Cited

U.S. PATENT DOCUMENTS

| | | | | |
|---|---|---|---|---|
| 8,639,621 | B1* | 1/2014 | Ellis | G06Q 40/00 705/41 |
| 8,751,435 | B2 | 6/2014 | Sridharan et al. | |
| 2011/0081634 | A1 | 4/2011 | Kurata et al. | |
| 2011/0178863 | A1 | 7/2011 | Daigle et al. | |
| 2012/0158528 | A1* | 6/2012 | Hsu | G06Q 20/20 705/16 |
| 2013/0073371 | A1* | 3/2013 | Bosworth | G06Q 30/02 705/14.35 |
| 2013/0091452 | A1* | 4/2013 | Sorden | G06F 3/048 715/771 |
| 2013/0246220 | A1* | 9/2013 | Hammad | G06Q 30/0639 705/26.9 |
| 2013/0332410 | A1 | 12/2013 | Asano et al. | |
| 2014/0074569 | A1* | 3/2014 | Francis | G06Q 20/40 705/14.3 |
| 2014/0122331 | A1* | 5/2014 | Vaish | G06Q 20/3674 705/41 |
| 2014/0129560 | A1 | 5/2014 | Grokop et al. | |
| 2014/0172533 | A1* | 6/2014 | Andrews | G06Q 30/0226 705/14.27 |
| 2014/0207680 | A1* | 7/2014 | Rephlo | H04B 5/0031 705/44 |
| 2014/0257958 | A1* | 9/2014 | Andrews | G06Q 20/02 705/14.27 |
| 2014/0279004 | A1* | 9/2014 | Thomas | G06Q 30/0261 705/14.58 |
| 2014/0279411 | A1* | 9/2014 | Bertanzetti | G06Q 20/3224 705/39 |
| 2015/0019355 | A1* | 1/2015 | Russell | G06Q 20/204 705/17 |
| 2015/0287085 | A1* | 10/2015 | Windmueller | G06Q 30/0261 705/14.58 |
| 2016/0048865 | A1* | 2/2016 | Poon | G06Q 30/0238 705/14.38 |
| 2016/0127486 | A1* | 5/2016 | Chen | H04L 67/18 709/206 |
| 2016/0140541 | A1* | 5/2016 | Pearson | G06Q 20/363 705/14.27 |
| 2016/0203506 | A1* | 7/2016 | Butler, IV | G06Q 30/0222 705/14.23 |
| 2016/0232518 | A1* | 8/2016 | Butler, IV | G06Q 20/367 |
| 2016/0321649 | A1* | 11/2016 | Dragushan | G06Q 20/342 |
| 2016/0328698 | A1* | 11/2016 | Kumaraguruparan | G06Q 20/3224 |

OTHER PUBLICATIONS

Moon, "International Preliminary Report on Patentability issued in International Application No. PCT/US2016/032801", dated Dec. 21, 2017, 7 pages.

* cited by examiner

POINT OF SALE TERMINAL GEOLOCATION

TECHNICAL FIELD

The present disclosure relates to inferring point of sale terminal locations within a merchant location using sensor-based signals detected by computing device hardware in combination with non-sensor-based signals detected by computing device software, providing improved data gathering, improved timing of presentation of offers, loyalty information, and redemption information, and improved ability to determine user behavior by using signals outside of the financial transaction path and without confirmation of a payment transaction.

BACKGROUND

Smartphones and other mobile computing devices are being used in new ways to streamline interactions between consumers, merchants, and third parties. Methods of providing advertisements, coupons, payment transactions, and other interactions are changing quickly as mobile computing device technology improves.

Location data from a mobile computing device can be used for numerous applications. Many applications use the location data for locating friends, playing games, and assisting a user with directions, for example. The location data can also be used to alert a user when the user and the user's computing device are in the vicinity of a point of interest. Mobile communication device application can trigger notifications with checkout-related information (for example, gift cards, offers, or loyalty information) when the user comes within a predefined radius of the merchant location. However, the more appropriate time to trigger this information is when the user is in a close proximity to the merchant's point of sale terminal.

In other conventional point of interest alert systems within a merchant location, a point of interest beacon is marked to represent a known point of interest within the merchant location. For example, a beacon placed near a known location of a display is marked so that the beacon, and the information provided in response to communicating with the beacon, is associated with the display. However, associating the beacon with the correct point of interest and the correct response information can be troublesome for the merchant's employees and is prone to error. For example, the beacon can be easily moved or wrongly programmed. Accordingly, there is a need for a method of precisely identifying the location of the merchant point of sale terminal so that the location data can be used to can trigger notifications with checkout-related transactional information (for example, gift cards, offers, or loyalty information) at a time when the user is most in need of this information.

SUMMARY

In certain example aspects described herein, inferring the geolocation of merchant point-of-sale (POS) terminals using non-payment events comprises predicting when the geolocation of a user computing device at a time when the device detects one or more signal events corresponds to the geolocation of the POS terminal. The user enters a merchant location and the user computing device monitors for pre-selected activity or signal events and transmit data to the account management system, where it is identified and analyzed. The account management system can determine a frequency of the signal events, or a number of signal events that occur within a pre-defined time period. When the frequency of signal events, or frequency of a determined sequence of signal events, reaches a pre-defined threshold, the account management system can identify the location of the POS terminal by identifying the common geolocation of the corresponding signal events.

The account management system saves the identified geolocation of the POS terminal so that when a user then enters the merchant location and transmits signal event data to the account management system, the system can compare the geolocation of the signal event data to the saved geolocation of the POS terminal to determine whether the user computing device is located at the POS terminal. If the user computing device is located at the POS terminal, the account management system transmits offers, rewards, incentives, loyalty account information, or other content for display on the user computing device. In an example embodiment, the content is displayed for use at the identified POS terminal.

In certain other example aspects described herein, systems and computer program products to infer the geolocation of merchant point-of-sale (POS) terminals using non-payment events are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
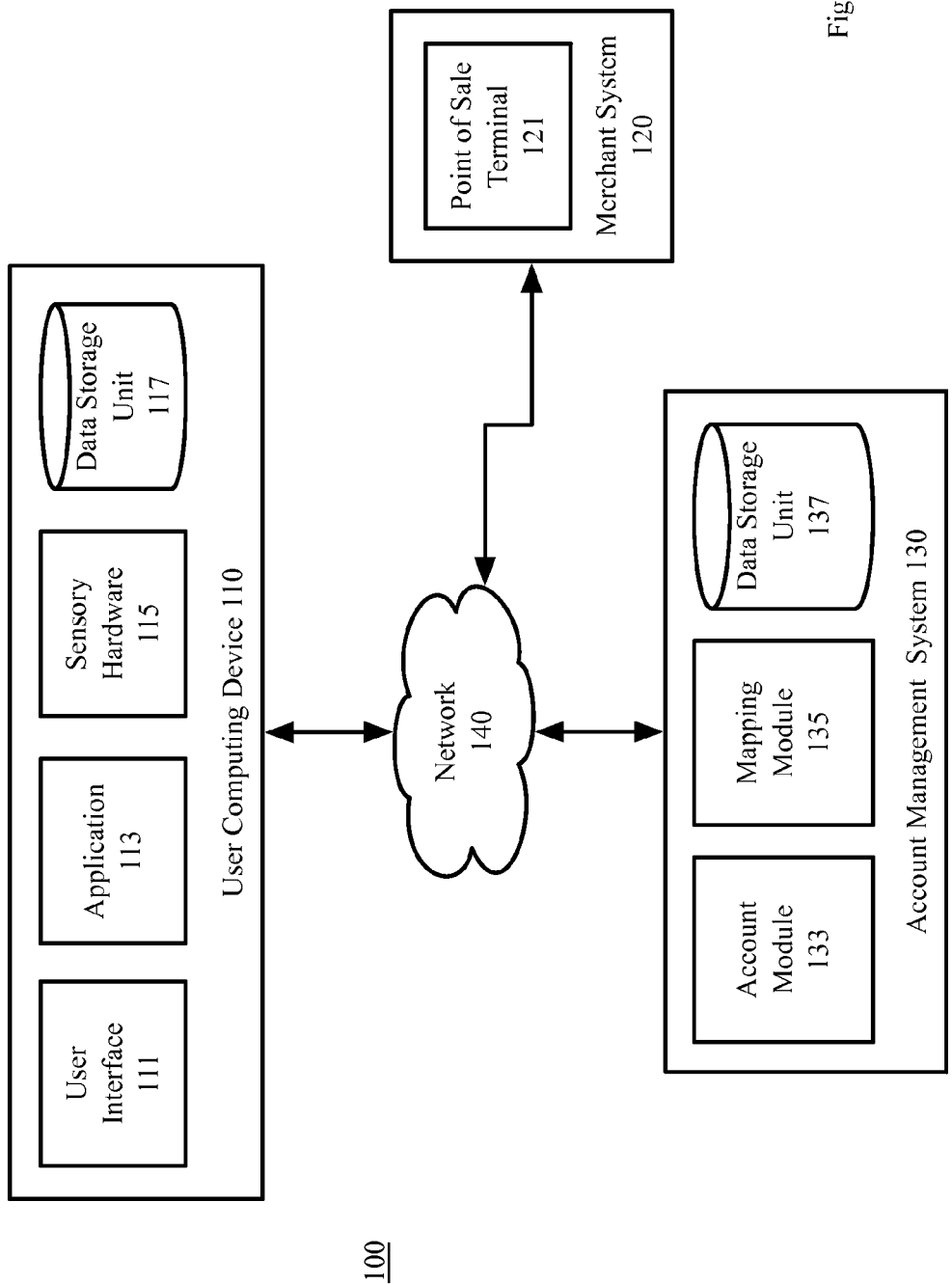
FIG. 1 is a block diagram depicting a point of sale location inference system, in accordance with certain example embodiments.

The example embodiments described herein provide methods and systems that infer the geolocation of merchant point-of-sale (POS) terminals using non-payment events. Determining the geolocation of the POS terminals enables the account management system to transmit check-out related transaction information (for example, gift cards, offers, loyalty information, rewards, incentives, and content) at a time when the user is most in need of this content.

In an example embodiment, an account management system creates a predictive model or trains a classifier model to predict the geolocation of merchant POS terminals based on non-payment signal event information. In an example embodiment, the predictive model is an artificial neural network or other form of adaptive system model, wherein the system analyzes data and relationships to find patterns in data. In another example embodiment, the classifier model is a Gaussian Mixture Model, decision tree, Markov Decision Process, or other mathematical framework for modeling decision making. In an example embodiment, the model is trained based on historical transaction data to predict when a user computing device is at a POS terminal based on non-payment signal data received by the account management system. In an example embodiment, the process is an ongoing learning process, wherein data is continuously added to the account management system and the model is continuously updated.

In an example embodiment, a user operating the user computing device enables a geolocation prediction feature on the user computing device. The user enters a merchant location and the user computing device monitors for pre-selected activity or signal events and transmit data to the account management system. In an example embodiment, the signal event comprises the sensory data such as sound of a POS terminal beep, the sound of a POS terminal keyboard, image of a bar code scanner or POS terminal, video of a bar code scanner or POS terminal, and user computing device movement in connection with the display of an offer, loyalty card, financial account number. In another example embodiment, the signal events comprises non-sensory related data such as changes in gift card or loyalty account balances, selections of a saved offer, display of financial data, display of an offer, receipt data, and other data that suggests a financial transaction was completed.

In an example embodiment, the user computing device transmits the signal event data to the account management system, where it is identified and analyzed. In an example embodiment, the signal event data further comprises a time. In this embodiment, the account management system can determine a frequency of the signal events, or a number of signal events that occur within a pre-defined time period. In another example embodiment, the signal event data further comprises a geolocation. In this embodiment, the account management system can identify a geolocation associated with each signal event. When the frequency of signal events, or frequency of a determined sequence of signal events, reaches a pre-defined threshold, the account management system can identify the location of the POS terminal by identifying the common geolocation of the corresponding signal events.

The account management system saves the identified geolocation of the POS terminal. When a user then enters the merchant location and transmits signal event data to the account management system, the system can compare the geolocation of the signal event data to the saved geolocation of the POS terminal to determine whether the user computing device is located at the POS terminal. If the user computing device is located at the POS terminal, the account management system transmits offers, rewards, incentives, loyalty account information, or other content for display on the user computing device. In an example embodiment, the content is displayed for use at the identified POS terminal. In this embodiment, it is advantageous to transmit and present the content when the user is located at the POS terminal instead of prior to or when the user enters the merchant location because the content is more useful to the user when the user is at the POS terminal and ready to complete a purchase transaction. In this embodiment, presenting the content at the precise time when the user is at the POS terminal results in a greater likelihood that the user will look at, redeem, and/or use the offer, reward, incentive, loyalty information, or other content. This results in a click-through, redemption, and/or use rate associated with the content presented to the user. In addition, knowing the location of the POS terminal and the identity of the user allows the account management system to provide the user with more specialized content at a time when the user is most in need of the content (for example, presenting merchant-specific loyalty information when the user is ready to complete the transaction with the merchant).

By using and relying on the methods and systems described herein, account management system is able to infer that the location of the POS terminal and provide purchase-related content to the user without being a part of the transaction or receiving payment transaction signals. As such, the systems and methods described herein may be employed to provide new or additional content to the user at a time when the user is most in need of this information and to more accurately determine which offers to provide to a user. The systems and methods described herein may also be employed to provide a more accurate and expedited responsiveness to the change in location of a POS terminal or addition of a new POS terminal. Additionally, the systems and methods described herein may also be employed to provide the user with up-to-date and accurate records of offer, reward, incentive, loyalty information, or other content available for use in a payment transaction with the merchant. Hence, the systems and methods described herein bridge the gap between the online and offline worlds and allow for the interaction between different types of computing technologies (for example, merchant point-of-sale devices, user mobile computing devices, and account management system computing devices) to achieve improved data gathering, improved understanding of how products are being used, and improved logging of transactions outside of the financial transaction path and without confirmation of a payment transaction.

Various example embodiments will be explained in more detail in the following description, read in conjunction with the figures illustrating the program flow.

Example System Architectures

Turning now to the drawings, in which like numerals indicate like (but not necessarily identical) elements throughout the figures, example embodiments are described in detail.

FIG. 1 is a block diagram depicting point of sale location inference system, in accordance with certain example embodiments. As depicted in FIG. 1, the exemplary operating environment 100 comprises a user computing device 110, a merchant computing system 120, and an account management computing system 130 that are configured to communicate with one another via one or more networks 140. In another example embodiment, two or more of these systems (including systems 110, 120, and 130) are integrated into the same system. In some embodiments, a user associated with a computing device must install an application and/or make a feature selection to obtain the benefits of the techniques described herein.

Each network 140 includes a wired or wireless telecommunication means by which network systems (including systems 110, 120, and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, Bluetooth Low Energy (BLE), near field communication network (NFC), any form of standardized radio frequency, infrared, sound (for example, audible sounds, melodies, and ultrasound), other short range communication channel, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

In an example embodiment, each network computing system (including systems 110, 120, and 130) includes a computing device having a communication module capable of transmitting and receiving data over the network 140. For example, each network system (including systems 110, 120, and 130) may comprise a server, personal computer, mobile computing device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120, and 130) are operated by a user, a merchant, and an account management system operator, respectively.

The merchant system 120 comprises at least one point of sale (POS) terminal 121 that is capable of processing a purchase transaction initiated by a user, for example, a cash register. In an example embodiment, the merchant operates a commercial store and the user indicates a desire to make a purchase by presenting a form of payment at the POS terminal 121.

In an example embodiment, the user computing device 110 may be a personal computer, mobile computing device (for example, notebook, computer, tablet computer, netbook computer, personal digital assistant (PDA), video game device, GPS locator device, cellular telephone, Smartphone or other mobile device), television, wearable computing devices (for example, watches, rings, or glasses), or other appropriate technology that includes or is coupled to a web server, or other suitable application for interacting with web page files. The user can use the user computing device 110 to store, view, interact with, and present offers, financial account information, loyalty account information, and other account information via a user interface 111 and an application 113. The application 113 is a program, function, routine, applet or similar entity that exists on and performs its operations on the user computing device 110. For example, the application 113 may be one or more of a shopping application, merchant system 120 application, an Internet browser, a digital wallet application, a loyalty card application, another value-added application, a user interface 111 application, or other suitable application operating on the user computing device 110. In another example embodiment, the application 113 is capable of recognizing and logging signal events and transmitting notification of the event to the account management system 130. In some embodiments, the user must install an application 113 and/or make a feature selection on the user computing device 110 to obtain the benefits of the techniques described herein.

An example user computing device 110 comprises one or more sensory hardware units 115, for example a camera, microphone, accelerometer, and other hardware units capable of detecting sensory-related inputs. In an example embodiment, the sensory hardware 115 comprises a camera capable of taking photos, recording video, and/or detecting images. In another example embodiment, the sensory hardware 115 comprises a microphone capable of detecting and/or recording sounds. In yet another example embodiment, the sensory hardware 115 comprises an accelerometer capable of detecting movement of the user computing device 110. In an example embodiment, the sensory hardware 115 operates in connection with the application 113. The sensory hardware 115 detects a sensory-related input while, or after an action is performed using the application 113 (for example, the user access, views, or makes changes to financial account information, loyalty information, offers, gift card information, or other information in a digital wallet application 113).

In an example embodiment, the data storage unit 117 and application 113 may be implemented in a secure element or other secure memory (not shown) on the user computing device 110. In another example embodiment, the data storage unit 117 may be a separate memory unit resident on the user computing device 110. An example data storage unit 117 enables storage of the offers, financial account information, gift card information, loyalty account information, and other user information. In another example embodiment, the data storage unit 117 enables storage of signal event notifications prior to transmission to the account management system 130. In an example embodiment, the data storage unit 117 can include any local or remote data storage structure accessible to the user computing device 110 suitable for storing information. In an example embodiment, the data storage unit 117 stores encrypted information, such as HTML5 local storage.

An example user computing device 110 communicates with the account management system 130. An example account management system 130 comprises an account module 133 and a mapping module 135. In an example embodiment, the account module 133 manages the registration of user and maintains an account for the user. In an example embodiment, the user account module 133 may collect anonymous, non-personal information for the user. For example, the user account module 133 may generate an anonymous user account identifier, such that the user is not personally identifiable. In another example embodiment, the user account module 133 may generate web-based user interfaces providing forms for the user to optionally register for an account management system 130 account. In an example embodiment, the user registers with the account management system 130 and enables features on the user computing device 110 to authorize the methods described herein.

The mapping module 135 gathers sensory and non-sensory-related data to identify the location of the POS terminal 121 at a merchant location based on the non-payment signal data received by the account management system 130. In an example embodiment, the mapping module 135 analyzes the data and learns to identify signals and/or signal frequencies that correspond to the location of the POS terminal 121 and to detect patterns that will aid in the identification of the POS terminal 121 location. In an example embodiment, the mapping module 135 creates a prediction model. The prediction model is an artificial neural network or other form of adaptive system model, wherein the mapping module 135 analyzes data and relationships to find patterns in data. In an example embodiment, this process is an ongoing learning process, wherein data is continuously added to the mapping module 135 and the model is continuously updated. In an example embodiment, the data is saved in the data storage unit 137.

In an example embodiment, the data storage unit 137 can include any local or remote data storage structure accessible to the account management system 130 suitable for storing information. In an example embodiment, the data storage unit 137 stores encrypted information, such as HTML5 local storage.

Figure 6:
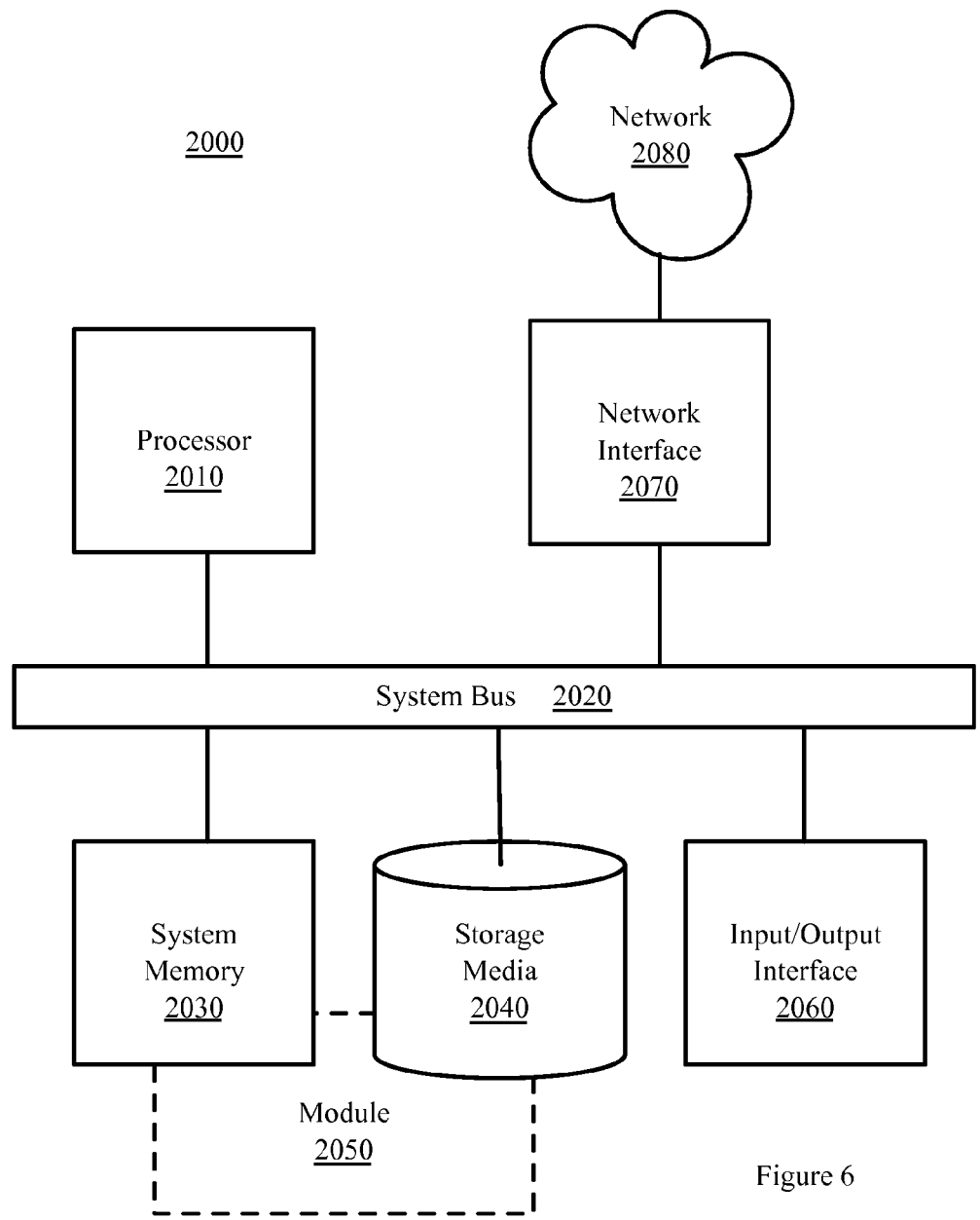
FIG. 6 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 99. The network 99 may include any type of data or communications network, including any of the network technology discussed with respect to FIG. 6.

The components of the example operating environment 100 are described hereinafter with reference to the example methods illustrated in FIGS. 2-5. The example methods of FIGS. 2-5 may also be performed with other systems and in other environments.

Example System Processes

Figure 2:
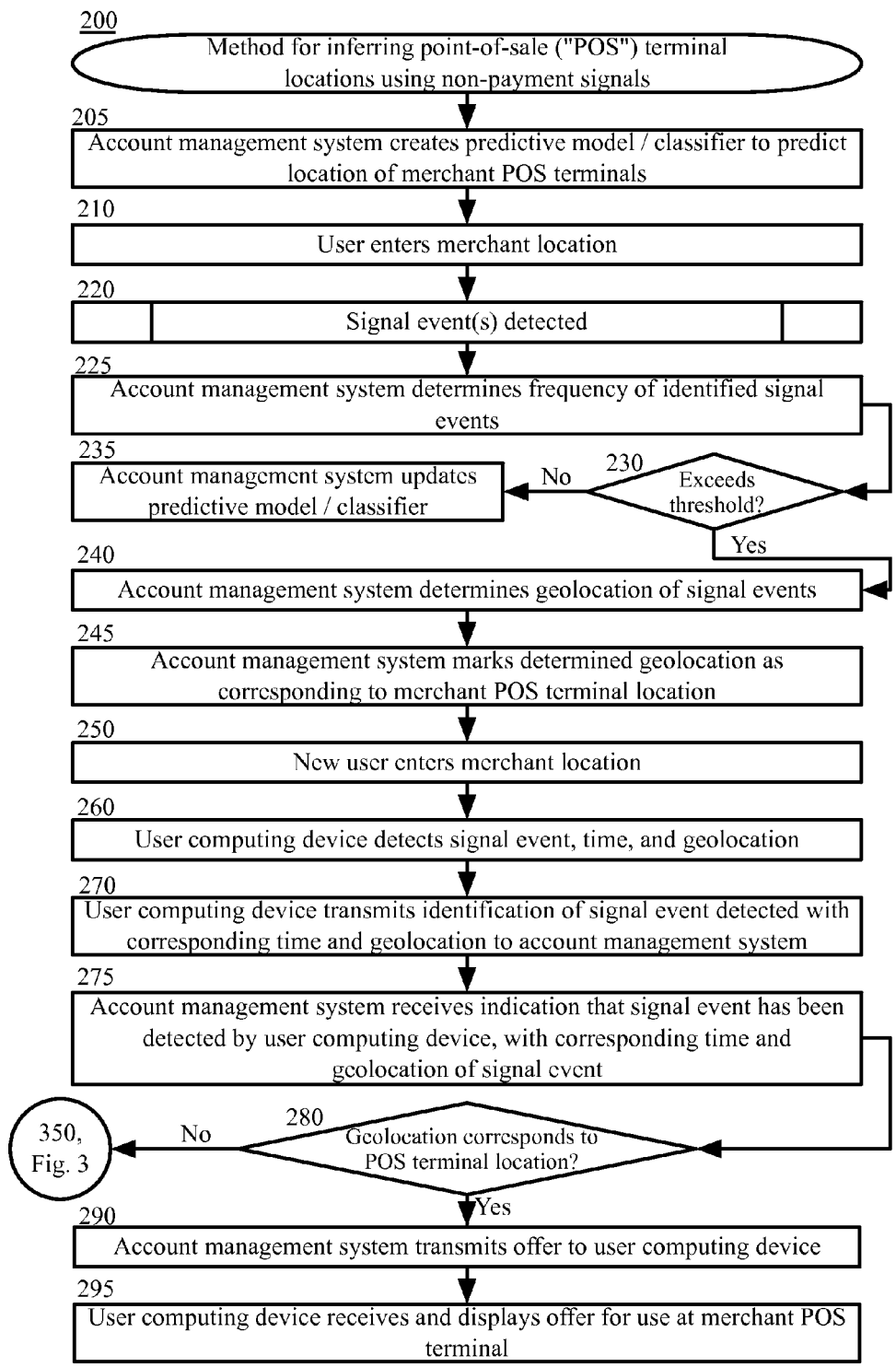
FIG. 2 is a block flow diagram depicting a method for inferring point of sale terminal locations using non-payment signals, in accordance with certain example embodiments.

FIG. 2 is a block flow diagram depicting a method for inferring POS terminal 121 locations using non-payment signals, in accordance with certain example embodiments. The method 200 is described with reference to the components illustrated in FIG. 1.

In block 205, the account management system 130 creates a predictive model or classifier to that will be used to predict a location of the POS terminal 121 within the merchant location. In an example embodiment, the predictive model or classifier is an artificial neural network or other form of adaptive system model, wherein the model analyzes data and relationships to find patterns in data. An artificial neural network is a computational module that functions to process information, such as studying behavior, pattern recognition, forecasting, and data compression. An example predictive model or classifier may be hardware and software based or purely software based and run in computer models. In an example embodiment, the predictive model or classifier model comprises inputs (for example sounds, images, video, and user computing device 110 movement in connection with the display of an offer, loyalty card, financial account number, as well as changes in gift card or loyalty account balances, selections of a saved offer, display of financial data, display of an offer, receipt data, and other data that suggests a financial transaction was completed) that are multiplied by weights and then computed by a mathematical function to determine the output (for example, the likelihood that the POS terminal 121 is located at a geolocation associated with the input given the frequency that the input data is detected). Depending on the weights, the computation will be different. In an example embodiment, an algorithm is used to adjust the weights of the predictive model or classifier in order to obtain the desired output from the network (for example, to accurately identify the location of the POS terminal 121). In an example embodiment, this process is an ongoing learning process, wherein non-payment transaction events (for example, inputs that are outside of the financial payment approval process) are continuous added and the model/classifier is updated. As more training data is fed into the model, it will continuously improve.

In another example embodiment, the classifier model is a Gaussian Mixture Model, decision tree, Markov Decision Process, or other mathematical framework for modeling decision making. In an example embodiment, the model is trained based on historical input data and data frequencies to predict the location of the POS terminal 121 based on the data received by the account management system 130. In an example embodiment, the process is an ongoing learning process, wherein data is continuously added to the account management system 130 and the model is continuously updated.

In block 210, the user enters the merchant location. In an example embodiment, the merchant location is a merchant store. In another example embodiment, the merchant location is a restaurant, gas station, convenience store, warehouse, office building, mall, shopping center, retail location, or other business location.

In an example embodiment, the user enables an application 113 on the user computing device 110 to authorize the transmission of the signal event data to the account management system 130. In an example embodiment, the user enables the application 113 to allow the user computing device 110 to monitor for pre-selected activity or signal events and transmit data to the account management system 130. In an example embodiment, the signal event comprises the sensory data such as sound of a POS terminal 121 beep, the sound of a POS terminal 121 keyboard, image of a bar code scanner or POS terminal 121, video of a bar code scanner or POS terminal 121, and user computing device 110 movement in connection with the display of an offer, loyalty card, financial account number. In another example embodiment, the signal events comprises non-sensory related data such as changes in gift card or loyalty account balances, selections of a saved offer, display of financial data, display of an offer, receipt data, and other data that suggests a financial transaction was completed.

In an example embodiment, the signal event data further comprises a time. In this embodiment, the account management system 130 can determine a frequency of the signal events, or a number of signal events that occur within a pre-defined time period. In another example embodiment, the signal event data further comprises a geolocation. In this embodiment, the account management system 130 can identify a geolocation associated with each signal event. When the frequency of signal events, or frequency of a determined sequence of signal events, reaches a pre-defined threshold, the account management system 130 can identify the location of the POS terminal 121 by identifying the common geolocation of the corresponding signal events.

In block 220, one or more signal event is detected. In an example embodiment, a signal event comprises sensory-related events (for example, the sound of a POS terminal 121 beep, the sound of a POS terminal 121 keyboard, image of a bar code scanner or POS terminal 121, video of a bar code scanner or POS terminal 121, and user computing device 110 movement in connection with the display of an offer, loyalty card, financial account number) and/or non-sensory-related events (for example, changes in gift card or loyalty account balances, selections of a saved offer, display of financial data, display of an offer, receipt data, and other data that suggests a financial transaction was completed). In an example embodiment, the signal event data occurs outside of the financial payment approval process. In this embodiment, the account management system 130 is not involved in or notified that a payment transaction between the user and the merchant system 120 has been initiated and/or completed as part of the financial payment approval process (for example, the account management system 130 is not the merchant system 120 or the issuer system associated with the financial account used to complete the payment transaction). In an example embodiment, the signal event data is obtained by the user computing device 110 and transmitted to the account management system 130 for analysis. The method for detecting signal events is described in more detail hereinafter with reference to the methods described in FIG. 3.

Figure 3:
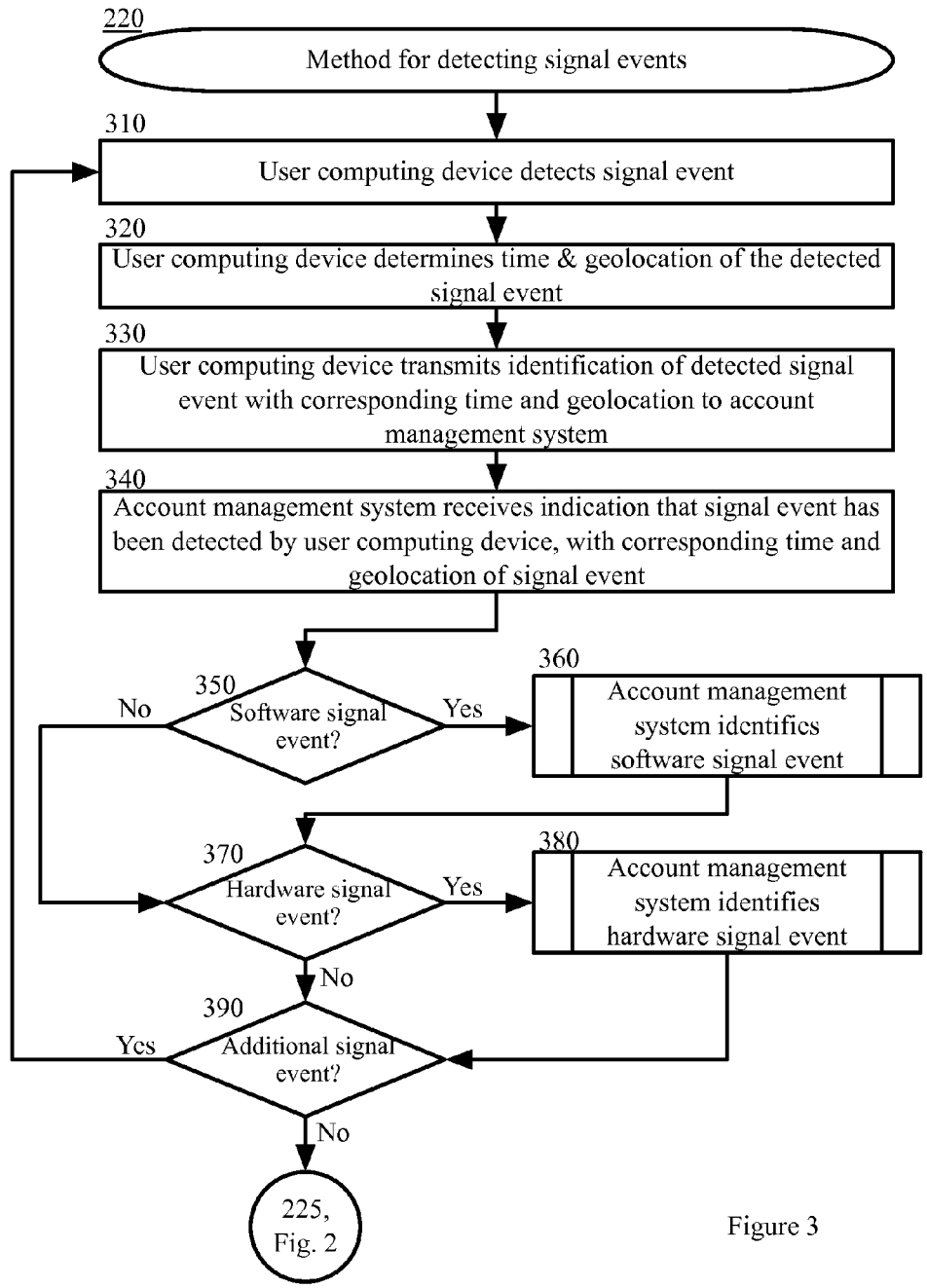
FIG. 3 is a block flow diagram depicting a method for detecting signal events, in accordance with certain example embodiments.

FIG. 3 is a block flow diagram depicting a method 220 for detecting signal events, in accordance with certain example embodiments, as referenced in block 220. The method 200 is described with reference to the components illustrated in FIG. 1.

In block 310, the user computing device 110 detects a signal event. In an example embodiment, the user moves through the merchant location and completes a purchase transaction with the merchant system 120. In an example embodiment, the purchase transaction comprises a cash transaction, a debit transaction, a credit transaction, a loyalty point redemption transaction, a prepaid transaction, or other form of purchase transaction. In an example embodiment, the account management system 130 does not participate in the purchase transaction. In this embodiment, the purchase transaction is processed according to the selected means and the account management system 130 is not notified of the desire to complete the transaction, approval of the financial transaction, or completion of the payment transaction. In an example embodiment, an issuer system, other than the account management system 130 approves a financial payment transaction and notifies the merchant system 120 of the approval.

In an example embodiment, the user accesses an application 113 on the user computing device 110 to perform an action prior to, during, or after the purchase transaction. In this embodiment, user computing device 110 monitors for a non-sensory-related signal event. In an example embodiment, the user action is not required for the purchase transaction and/or offer redemption to be completed. For example, the user performs an action on the user computing device 110 in the merchant location to, for example, access an offer, gift account information, loyalty account information, or financial account information, adjust an account balance, request directions, or other action performed by the user computing device 110. In an example embodiment, the user performs a near field communication transaction and the application 113 detects transmission of payment account information to the POS terminal 121 or other communication between the user computing device 110 and the merchant system 120. In another example embodiment, the user changes a gift card or loyalty point balance. In another example embodiment, the user displays a gift card, loyalty card, offer, and/or financial account identifier. In this embodiment, the user computing device 110 detects the display of the information and/or an action initiated by the user such as zooming in on the displayed information. In an example embodiment, the user computing device 110 logs the detected non-sensory-related event.

In an example embodiment, the user computing device 110 continuously monitors for a number of user actions, for example, changes in user computing device 110 location, display of information on the user interface 111, account updates, receipt of information, and other actions determined by the predictive model to be related to a purchase transaction. In an example embodiment, the account management system 130 communicates new actions and updates to the user computing device 110 as the predictive model is updated. In another example embodiment, a system (for example, a loyalty account system, a gift card account system, a receipt management system, or other non-account management system 130) transmits the indication that the user action has been taken.

In another example embodiment, the sensory hardware 115 on the user computing device 110 detects a sensory-related signal event in connection with the user using the user computing device 110 to perform an action prior to, during, or after the purchase transaction (for example, a movement of the device 110) and/or the sensory hardware 115 detecting an external event (for example, a sound or image). In an example embodiment, the user computing device detects a sensory-related action in connection with one or more non-sensory-related actions (for example, the display of a gift card, loyalty card, offer, and/or financial account identifier). In an example embodiment, the microphone sensory hardware 115 detects a beep or sound that the account management system 130 may identify as a POS terminal 121 reader or scanner. In another example embodiment, the microphone sensory hardware 115 detects a keypad or typing sound that the account management system 130 may identify as a POS terminal keyboard. In another example embodiment, the camera sensory hardware 115 detects an image (for example, a photograph or video image) of the POS terminal 121, scanner, reader, keyboard, scale, register, or other POS terminal 121 part). In yet another example embodiment, the accelerometer sensory hardware 115 detects a movement of the user computing device 110 that corresponds to positioning it for a POS terminal 121 scanner or reader. In an example embodiment, the user computing device 110 logs the detected sensory-related event.

In an example embodiment, the user computing device 110 continuously monitors for a number of sensory-related inputs, for example, sounds, images, movements, and other actions determined by the predictive model to be related to a purchase transaction. In an example embodiment, the account management system 130 communicates new actions and updates to the user computing device 110 as the predictive model is updated. In another example embodiment, a system (for example, a loyalty account system, a gift card account system, a receipt management system, or other non-account management system 130) transmits the indication that the user action has been taken.

In block 320, the user computing device 110 determines a time and a geolocation associated with the signal event. In an example embodiment, the user computing device 110 logs the action, a location where the action occurred, and/or a time that the action occurred. In an example embodiment, time comprises a real time or difference from a start of a monitoring session or a time zero. In an example embodiment, the user computing device 110 utilizes the global positioning system (GPS) to log the approximate longitude and latitude of the device 110. In another example embodiment, the user computing device 110 uses another satellite-based positioning system to log the location data. In yet another example embodiment, the user computing device 110 calculates the distance of the device 110 from the nearest Wi-Fi locations, radio towers, cell towers, or combinations of these items to determine its position.

In block 330, the user computing device 110 transmits the identification of the signal event detection with the corresponding time and geolocation to the account management system 130. In an example embodiment, the user computing device 110 transmits a notification to the account management system 130 each time a signal event is detected. In another example embodiment, the account management system 130 is continuously monitoring or communicating with the user computing device 110 to detect when the user computing device 110 logs a signal event. In this example embodiment, the user enables a feature or option on the user computing device 110 to monitoring. In another example embodiment, the user computing device 110 logs the signal events and transmits the two or more notifications to the account management system 130 at a time.

In block 340, the account management system 130 receives the identification of the signal event detection with the corresponding time and geolocation from the user computing device 110.

In an example embodiment, the transmission further comprises an identification of the user computing device 110 and/or user (for example, an identification of the user's account management system 130 account). In this embodiment, the account management system 130 can identify the user and respond to the user computing device 110 with additional information based on the determined location of the POS terminal 121.

In another example embodiment, the account management system 130 receives signal events from third party systems (for example, loyalty systems, gift card account systems, and offer systems). In this embodiment, the signal events are linked to the user's account management system 130 account and are analyzed with the signal events received from the user computing device 110. For example, the loyalty system transmitted notification of an adjusted loyalty account balance or the gift card system transmitted notification of an adjusted gift card balance amount.

In block 350, the account management system 130 determines whether the signal event comprises a software signal event. In an example embodiment, the account management system 130 analyzes each signal event to identify the event and the corresponding data. In an example embodiment, a software signal event comprises a non-sensory-related signal event (for example, a signal event detected through use of the application 113 rather than the sensory hardware 115).

If the account management system 130 determines that the signal event comprises a software signal event, the method 220 continues to block 360 in FIG. 3.

In block 360 the account management system 130 identifies the software signal event. In an example embodiment, a software signal event comprises a signal, data, or other indication that may be used by the predictive model to determine a likelihood that a purchase transaction occurred, an offer was redeemed, and/or the user computing device 110 is located near a POS terminal 121. In an example embodiment, the account management system 130 uses the indicated action in combination with a time that the action took place and/or a location of the user computing device 110 to determine a likelihood that a purchase transaction occurred, an offer was redeemed, and/or the user computing device 110 is located near a POS terminal 121. In another example embodiment, the account management system 130 assigns weights to particular actions to determine a likelihood that a purchase transaction occurred, an offer was redeemed, and/or the user computing device 110 is located near a POS terminal 121. For example, if an offer or financial account information was displayed at a merchant location, a greater weight may be assigned than if the same action was taken at a non-merchant location. The method for identifying software signal events is described in more detail hereinafter with reference to the methods described in FIG. 4.

Figure 4:
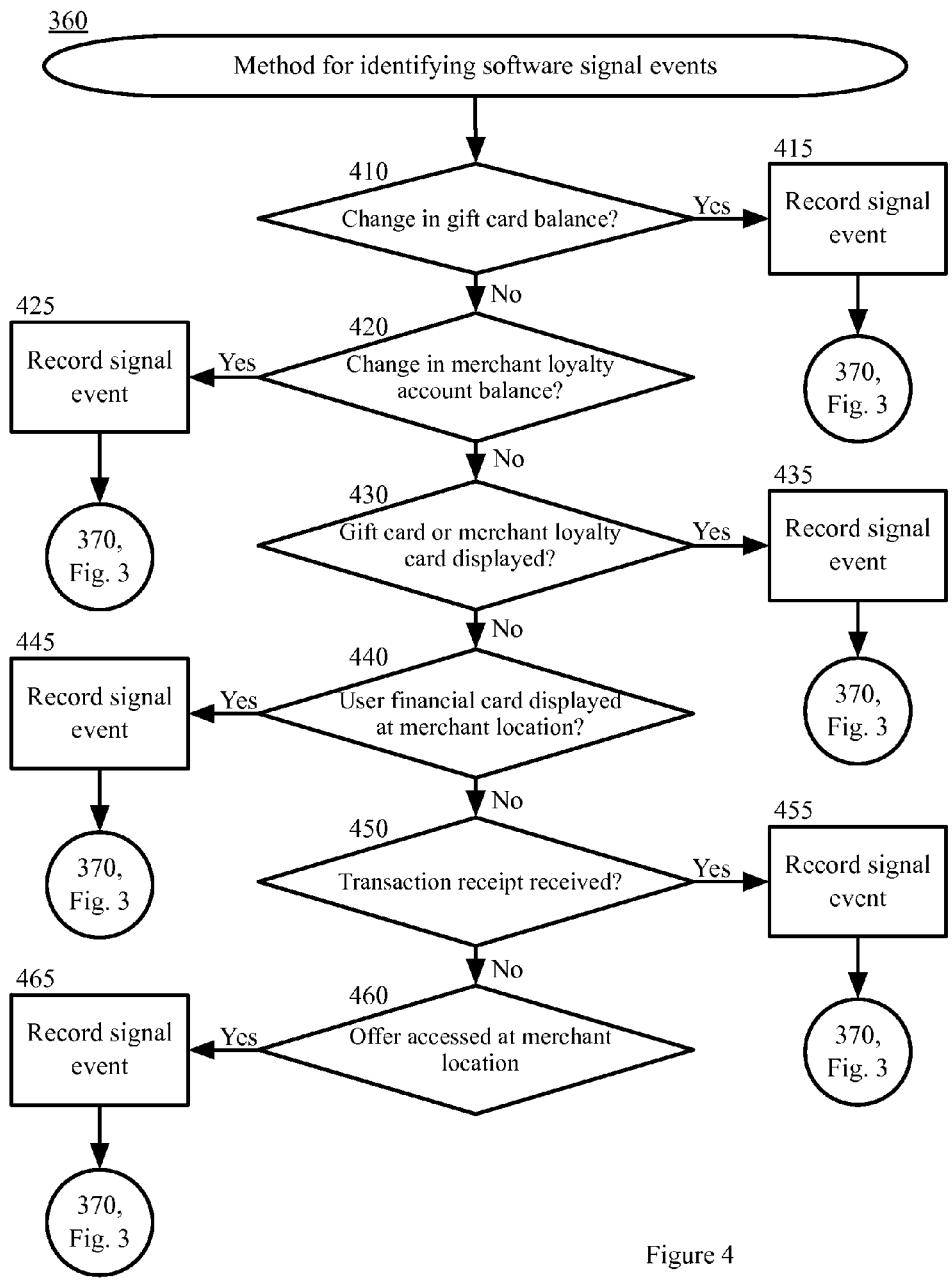
FIG. 4 is a block flow diagram depicting a method for identifying software signal events, in accordance with certain example embodiments.

FIG. 4 is a block flow diagram depicting a method 360 for identifying software signal events, in accordance with certain example embodiments, as referenced in block 360. The method 360 is described with reference to the components illustrated in FIG. 1.

In block 410, the account management system 130 determines whether the signal event comprises a change in a gift card balance. In an example embodiment, the user has associated or registered a gift card with the user's account management system 130 account. In this embodiment, the user may manually enter the account management system 130 account and update the gift card balance. In another example embodiment, the user may use an application 113 on the user computing device 110 to update the gift card balance. In yet another example embodiment, the account management system 130 may receive a notification of the change in gift card balance from a system that manages the user's gift card account.

If the account management system 130 determines that the indication comprises a change in a gift card balance, the method 360 proceeds to block 415 and the account management system 130 records the signal event.

The method 360 then proceeds to block 370 in FIG. 3.

Returning to block 410, if the account management system 130 determines that signal event does not comprise a change in a gift card balance, the method 360 proceeds to block 420.

In block 420, the account management system 130 determines whether signal event comprises a change in a merchant loyalty account balance. In an example embodiment, the user has associated or registered a loyalty account with the user's account management system 130 account. In this embodiment, the user may manually enter the account management system 130 account and update the loyalty account balance. In another example embodiment, the user may use an application 113 on the user computing device 110 to update the loyalty account balance. In yet another example embodiment, the account management system 130 may receive a notification of the change in loyalty account balance from a system that manages the user's loyalty account.

If the account management system 130 determines that signal event comprises a change in a loyalty account balance, the method 360 proceeds to block 425 and the account management system 130 records the signal event.

The method 360 then proceeds to block 370 in FIG. 3.

Returning to block 420, if the account management system 130 determines that signal event does not comprise a change in a loyalty account balance, the method 360 proceeds to 430.

In block 430, the account management system 130 determines whether signal event comprises a display of a gift card or loyalty card on the user computing device 110. In an example embodiment, the user has saved an account identifier in the user computing device 110. When the user accessed the saved account identifier, the user computing device 110 displays the identifier for the user to read or present to the merchant system 120. In an example embodiment, signal event also comprises a location of the user computing device 110 when the identifier was displayed. In this embodiment, the account management system 130 uses the location to determine whether it corresponds to a merchant location.

If the account management system 130 determines that signal event comprises a display of a gift card or loyalty card on the user computing device 110, the method 360 proceeds to block 435 and the account management system 130 records the signal event.

The method 360 then proceeds to block 370 in FIG. 3.

Returning to block 430, if the account management system 130 determines that signal event does not comprise a display of a gift card or loyalty card on the user computing device 110, the method 360 proceeds to block 440.

In block 440, the account management system 130 determines whether signal event comprises a display of a financial account card on the user computing device 110. In an example embodiment, the user has saved an account identifier in the user computing device 110. When the user accessed the saved account identifier, the user computing device 110 displays the identifier for the user to read or present to the merchant system 120. In an example embodiment, signal event also comprises a location of the user computing device 110 when the identifier was displayed. In this embodiment, the account management system 130 uses the location to determine whether it corresponds to a merchant location.

If the account management system 130 determines that signal event comprises a display of a financial account card on the user computing device 110, the method 360 proceeds to block 445 and the account management system 130 records the signal event.

The method 360 then proceeds to block 370 in FIG. 3.

Returning to block 440, if the account management system 130 determines that signal event does not comprise a display of a financial account card on the user computing device 110, the method 360 proceeds to block 450.

In block 450, the account management system 130 determines whether signal event comprises a transaction receipt. In an example embodiment, the user has associated or registered an electronic message (e-mail) account with the user's account management system 130 account. In this embodiment, the user may opt to receive an electronic version of the transaction receipt for the purchase transaction via e-mail. The account management system 130 reviews the e-mail message to determine if it comprises a receipt. In another example embodiment, the user may scan or manually enter the transaction receipt into the user's account management system 130 account. In another example embodiment, the account management system 130 extracts information from the receipt. For example, purchase information, merchant name, and other information that identifies the purchase and whether an offer was redeemed.

If the account management system 130 determines that signal event comprises a transaction receipt, the method 360 proceeds to block 455 and the account management system 130 records the signal event.

The method 360 then proceeds to block 370 in FIG. 3.

Returning to block 450, if the account management system 130 determines that signal event does not comprise a purchase receipt, the method 260 proceeds to block 460.

In block 460, the account management system 130 determines whether signal event comprises a display of an offer on the user computing device 110. In an example embodiment, the user has saved the offer in the user computing device 110 or in the user's account management system 130 account. When the user accessed the saved offer, the user computing device 110 displays the offer for the user to read or present to the merchant system 120. In an example embodiment, signal event also comprises a location of the user computing device 110. In an example embodiment, the user computing device 110 was located at the merchant location when the offer was presented. In this embodiment, the account management system 130 uses the location to determine whether it corresponds to a merchant location.

If the account management system 130 determines that signal event comprises a display of an offer on the user computing device 110, the method 360 proceeds to block 465 and the account management system 130 records the signal event.

In an example embodiment, the account management system 130 adds and modifies the events or signals it looks for in signal events based on the predictive model. For example, if the predictive model determines that the user entering search criteria for a merchant location and then the user computing device 110 being located at the merchant location is a factor that may indicate that the user completed a purchase transaction or is near the POS terminal 121, the account management system will make the appropriate determination when evaluating whether a signal event has occurred.

The method 360 then proceeds to block 370 in FIG. 3.

Returning to FIG. 3, if the account management system 130 determines that the signal event comprises something other than a software signal event (for example, a software signal event in addition to another event), the method 360 proceeds to block 370.

In block 370, the the account management system 130 determines whether the signal event comprises a hardware signal event. In an example embodiment, the account management system 130 analyzes each signal event to identify the event and the corresponding data. In an example embodiment, a hardware signal event comprises a sensory-related signal event (for example, a signal event detected through use of the sensory hardware 115 in addition to or in conjunction with the application 113).

If the account management system 130 determines that the signal event comprises a hardware signal event, the method 220 continues to block 380 in FIG. 3.

In block 380 the account management system 130 identifies the hardware signal event. In an example embodiment, a hardware signal event comprises a sound, movement, image, signal, data, or other indication that was detected by the sensory hardware 115 of the user computing device 110 and that may be used by the predictive model to determine a likelihood that a purchase transaction occurred, an offer was redeemed, and/or the user computing device 110 is located near a POS terminal 121. In an example embodiment, the account management system 130 uses the data in combination with a time that the data was received and/or a location of the user computing device 110 to determine a likelihood that a purchase transaction occurred, an offer was redeemed, and/or the user computing device 110 is located near a POS terminal 121. In another example embodiment, the account management system 130 assigns weights to particular data to determine a likelihood that a purchase transaction occurred, an offer was redeemed, and/or the user computing device 110 is located near a POS terminal 121. For example, if an offer or financial account information was displayed at a merchant location, and the accelerometer sensory hardware 115 detects movement of the user computing device 110 that indicates a scanning of the user interface 111, a greater weight may be assigned than if the same data was taken at without display of the offer or financial account information. The method for identifying hardware signal events is described in more detail hereinafter with reference to the methods described in FIG. 5.

Figure 5:
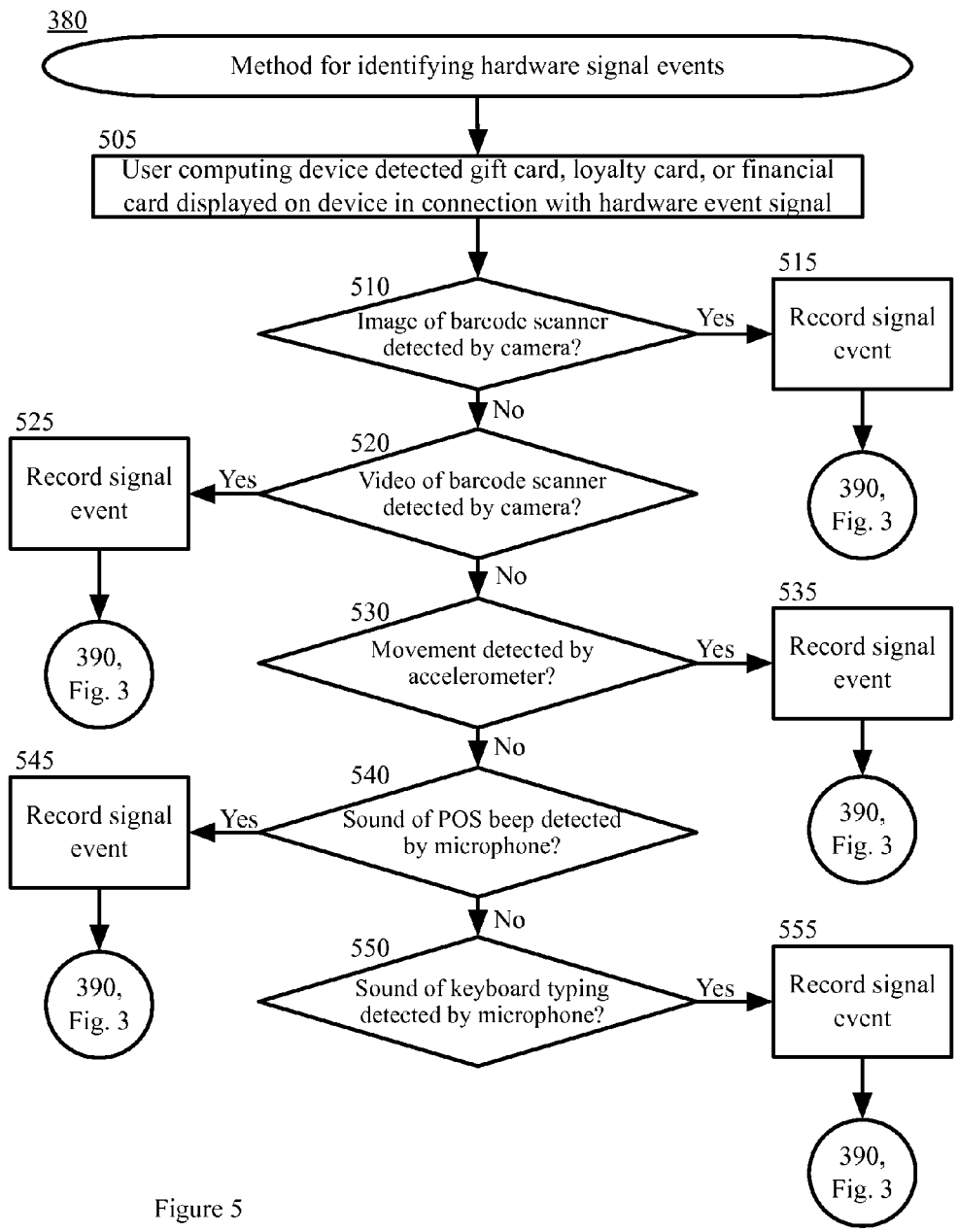
FIG. 5 is a block flow diagram depicting a method for identifying hardware signal events, in accordance with certain example embodiments.

FIG. 5 is a block flow diagram depicting a method 380 for identifying hardware signal events, in accordance with certain example embodiments, as referenced in block 380. The method 380 is described with reference to the components illustrated in FIG. 1.

In block 510, account management system 130 determines that the user computing device 110 transmitted a hardware signal event in addition to signal event that corresponds to a display of a gift card, loyalty card, or other financial account information on the user interface 111 of the device 110. In an example embodiment, the predictive model and/or account management system 130 determines that certain hardware signal events, when detected in combination with certain software signal events provide a greater likelihood that a purchase transaction occurred, an offer was redeemed, and/or the user computing device 110 is located near a POS terminal 121.

In block 510, the account management system 130 determines whether the signal event comprises an image of a POS terminal 121 detected by the camera sensory hardware 115. In an example embodiment, the sensory hardware 115 comprises a camera capable of capturing images or photographs. In this embodiment, the camera sensory hardware 115 captured one or more images that the account management system 130 and/or predictive model determines are POS terminal 121 hardware or parts (for example a barcode scanner, a terminal reader, or other hardware). In example embodiment, the capturing of the POS terminal 121 image in connection with the displayed gift card, loyalty card, or financial card displayed by the user interface 111 of the user computing device 110 signals that the displayed information is likely to have been scanned or read by the POS terminal 121.

If the account management system 130 determines that the signal event comprises an image of a POS terminal 121 detected by the camera sensory hardware 115, the method 380 proceeds to block 515 and the account management system 130 records the signal event.

The method 380 then proceeds to block 390 in FIG. 3.

Returning to block 510, if the account management system 130 determines that signal event does not comprise an image of a POS terminal 121 detected by the camera sensory hardware 115, the method 380 proceeds to block 520.

In block 520, the account management system 130 determines whether signal event comprises a video of a POS terminal 121 detected by the camera sensory hardware 115. In an example embodiment, the sensory hardware 115 comprises a camera capable of capturing video images. In this embodiment, the camera sensory hardware 115 captured one or more video images that the account management system 130 and/or predictive model determines are POS terminal 121 hardware or parts (for example a barcode scanner, a terminal reader, or other hardware). In example embodiment, the capturing of the POS terminal 121 video in connection with the displayed gift card, loyalty card, or financial card displayed by the user interface 111 of the user computing device 110 signals that the displayed information is likely to have been scanned or read by the POS terminal 121.

If the account management system 130 determines that the signal event comprises a video of a POS terminal 121 detected by the camera sensory hardware 115, the method 380 proceeds to block 525 and the account management system 130 records the signal event.

The method 380 then proceeds to block 390 in FIG. 3.

Returning to block 520, if the account management system 130 determines that signal event does not comprise a video of a POS terminal 121 detected by the camera sensory hardware 115, the method 380 proceeds to block 530.

In block 530, the account management system 130 determines whether signal event comprises a movement of the user computing device 110 detected by the accelerometer sensory hardware 115. In an example embodiment, the sensory hardware 115 comprises an accelerometer capable of detecting movement, movement patterns, acceleration, acceleration patterns, speed changes, vibrations, or other changes in motion. In this embodiment, the accelerometer sensory hardware 115 detected one or more movements or motion patterns that the account management system 130 and/or predictive model determines are associated with scanning the user computing device 110 at the POS terminal 121 (for example at a barcode scanner, a terminal reader, or other POS terminal 121 hardware). In example embodiment, the detected movement or motion pattern in connection with the displayed gift card, loyalty card, or financial card displayed by the user interface 111 of the user computing device 110 signals that the displayed information is likely to have been scanned or read by the POS terminal 121.

If the account management system 130 determines that the signal event comprises a movement of the user computing device 110 detected by the accelerometer sensory hardware 115, the method 380 proceeds to block 535 and the account management system 130 records the signal event.

The method 380 then proceeds to block 390 in FIG. 3.

Returning to block 530, if the account management system 130 determines that signal event does not comprise a movement of the user computing device 110 detected by the accelerometer sensory hardware 115, the method 380 proceeds to block 540.

In block 540, the account management system 130 determines whether signal event comprises a sound of a POS terminal 121 beep detected by the microphone sensory hardware 115. In an example embodiment, the sensory hardware 115 comprises a microphone capable of detecting sounds. In this embodiment, the microphone sensory hardware 115 detected one or more sounds or sound patterns that the account management system 130 and/or predictive model determines are associated with a beep or other sound of the POS terminal 121 (for example at a barcode scanner, a terminal reader, or other POS terminal 121 hardware). In example embodiment, the detected sound or sound pattern in connection with the displayed gift card, loyalty card, or financial card displayed by the user interface 111 of the user computing device 110 signals that the displayed information is likely to have been scanned or read by the POS terminal 121.

If the account management system 130 determines that the signal event comprises a sound of a POS terminal beep detected by the microphone sensory hardware 115, the method 380 proceeds to block 545 and the account management system 130 records the signal event.

The method 380 then proceeds to block 390 in FIG. 3.

Returning to block 540, if the account management system 130 determines that signal event does not comprise a sound of a POS terminal beep detected by the microphone sensory hardware 115, the method 380 proceeds to block 550.

In block 520, the account management system 130 determines whether signal event comprises a sound of a POS terminal 121 keyboard typing detected by the microphone sensory hardware 115. In an example embodiment, the sensory hardware 115 comprises a microphone capable of detecting sounds. In this embodiment, the microphone sensory hardware 115 detected one or more sounds or sound patterns that the account management system 130 and/or predictive model determines are associated with typing, keying, or other sound of the POS terminal 121 (for example at a keyboard or other POS terminal 121 hardware). In example embodiment, the detected sound or sound pattern in connection with the displayed gift card, loyalty card, or financial card displayed by the user interface 111 of the user computing device 110 signals that the displayed information is likely to have been typed into the POS terminal 121.

If the account management system 130 determines that the signal event comprises a sound of a POS terminal 121 keyboard typing detected by the microphone sensory hardware 115, the method 380 proceeds to block 555 and the account management system 130 records the signal event.

The method 380 then proceeds to block 390 in FIG. 3.

Returning to FIG. 3, in block 390, the account management system 130 determines whether notifications of additional signal events have been received. In an example embodiment, the account management system 130 repeats the analysis for each signal event received.

If additional signal events have been received, the method 220 proceeds to block 310 in FIG. 3.

Returning to block 390, if additional signal events have not been received, or is the account management system 130 and/or predictive model have sufficient signal events analyzed, the method 220 proceeds to block 225 in FIG. 2.

Returning to FIG. 2, in block 225, the account management system 130 determines the frequency of the identified signal events, or a portion of the identified signal events. In an example embodiment, the predictive model identifies combinations of signal events, that when received at an identified frequency, above a frequency threshold, or within a pre-defined amount of time, indicate a higher likelihood that the user computing device 110 is located near the POS terminal 121. By determining the frequency of the identified signal events, the account management system 130 can determine whether the frequency corresponds or exceeds the frequency threshold.

In block 230, the account management system 130 determines whether the frequency of the identified signal events, or a portion of the identified signal events, meets or exceeds a frequency threshold. In an example embodiment, the account management system 130 compares the determined frequency of the identified signal events to the frequency threshold.

If the frequency of the identified signal events, or a portion of the identified signal events, exceeds the frequency threshold, the method 200 proceeds to block 235 in FIG. 2.

In block 235, the account management system 130 updates the predictive model or classifier model based on the signal event data. In an example embodiment, the process is an ongoing learning process, wherein data is continuously added to the account management system 130 and the model is continuously updated. In an example embodiment, the changed or lower frequency of the identified signal events may indicate that the POS terminal 121 has been moved or a new POS terminal 121 has been added. By updating the predictive model or classifier model, the account management system 130 is better able to identified the new locations.

Returning to block 230, if the frequency of the identified signal events, or a portion of the identified signal events, exceeds the frequency threshold, the method 200 proceeds to block 240 in FIG. 2.

In block 240, the account management system 130 determines the geolocation of the identified signal events. In an example embodiment, signal event data transmitted by the user computing device 110 to the account management system 130 comprises a time and a geolocation where the signal event occurred. Because the signal event data meets or exceeds the frequency threshold, the account management system 130 can determine that there is a higher likelihood that the signal event(s) took place near the POS terminal 121. By determining the corresponding geolocation of each of the signal events, it can deduce the geolocation of the POS terminal 121.

In block 245, the account management system 130 marks the determined geolocation as corresponding to the merchant POS terminal 121 location. In an example embodiment, the account management system 130 uses an algorithm, function, average, or other mathematical equation to compute the geolocation of the POS terminal 121 based on the geolocation of each of the signal events. In another example embodiment, the geolocation of the signal events is the same or similar, and the geolocation of the POS terminal corresponds to the signal event geolocation. In another example embodiment, the account management system 130 clusters or groups the geolocations of the signal events and identifies any outlier geolocations. In this embodiment, account management system 130 can remove the outlier geolocations from the computations.

In an example embodiment, the account management system 130 saves the determined geolocation of the merchant POS terminal 121 location. In this embodiment, when a user computing device 110 is detected at a location that corresponds to the determined geolocation, the account management system 130 can determine that the user computing device is located at the merchant's POS terminal 121.

In block 250, a user enters the merchant location. In an example embodiment, the account management system 130 has previously identified the location of the POS terminal 121 in the merchant location.

In block 260, the user computing device 110 detects a signal event, time, and geolocation associated with the signal event. In an example embodiment, the detection of the signal event, time, and geolocation by the user computing device 110 occurs in manner consistent with the methods described in blocks 310 and 320 of FIG. 3.

In block 270, the user computing device 110 transmits notification of the identified signal event, with the corresponding time and geolocation to the account management system 130. In an example embodiment, the transmission of the signal event, with the corresponding time and geolocation occurs in a manner consistent with the methods described in block 330 of FIG. 3.

In block 275, the account management system 130 receives the signal event, with the corresponding time and geolocation from the user computing device 110. In an example embodiment, the signal event, with the corresponding time and geolocation is received in a manner consistent with the methods described in block 340 in FIG. 3.

In block 280, the account management system 130 determines whether the geolocation of the detected signal event corresponds to the geolocation of an identified POS terminal 121. In an example embodiment, the geolocation of the signal event is compared to the known geolocations of POS terminals 121 previously identified.

If the geolocation of the detected signal event does not correspond to a known geolocation of a POS terminal 121 previously identified, the method 200 proceeds to block 350 in FIG. 3. In an example embodiment, the signal event is identified and processed by the account management system 130 using the methods previously described in FIGS. 3-5 for use in identifying the geolocation of the POS terminal 121.

Returning to block 280 in FIG. 2, if the geolocation of the detected signal event corresponds to a known geolocation of a POS terminal 121 previously identified, the method 200 proceeds to block 290 in FIG. 2.

In block 290, the account management system 130 transmits and offers, rewards, incentives, loyalty account information, or other content to the user computing device 110. In an example embodiment, the user has an account maintained by or accessible to the account management system 130. In this embodiment, the user is provided with offers, rewards, incentives, loyalty account information, or other content associated with the user's account in response to determining that the user computing device 110 is located near a geolocation of an identified POS terminal 121 in the merchant's location. In another example embodiment, the user does not have an account maintained by or accessible to the account management system 130. In this embodiment, the information received from the user is not associated with a user account and the user is provided with offers, rewards, incentives, or other content in response to determining that the user computing device 110 is located near a geolocation of an identified POS terminal 121 in the merchant's location.

In block 295, the user computing device 110 receives and displays the offers, rewards, incentives, loyalty account information, or other content on the user interface 111. In an example embodiment, the content is displayed for use at the identified POS terminal 121. In this embodiment, it is advantageous to transmit and present the content when the user is located at the POS terminal 121 instead of prior to or when the user enters the merchant location. The content is more useful to the user when the user is at the POS terminal 121 and ready to complete a purchase transaction. In this embodiment, presenting the content at the precise time when the user is at the POS terminal 121 results in a greater likelihood that the user will look at, redeem, and/or use the offer, reward, incentive, loyalty information, or other content. This results in a click-through, redemption, and/or use rate associated with the content presented to the user. In addition, knowing the location of the POS terminal 121 and the identity of the user allows the account management system 130 to provide the user with more specialized content at a time when the user is most in need of the content (for example, presenting merchant-specific loyalty information when the user is ready to complete the transaction with the merchant). In an example embodiment, the results in a higher likelihood that a purchase transaction will be completed and accordingly in higher revenue for the merchant system 120.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify point-of-sale terminal geolocations, comprising:
    receiving, by one or more computing devices and from a user computing device, an action notification comprising two or more action events, a time for each of the two or more action events, and a geolocation of the user computing device when each of the two or more action events was detected by the user computing device, the two or more action events comprising at least one sensory-related action event detected by hardware components of the user computing device and at least one non-sensory related action event detected by software components of the user computing device;
    determining, automatically by the one or more computing devices, that a frequency of at least a subset of the two or more action events meets or exceeds a pre-determined frequency threshold based on the time for each of the subset of the two or more action events;
    in response to determining that the frequency of the at least a subset of the two or more action events meets or exceeds the pre-determined threshold, determining, automatically by the one or more computing devices, a geolocation of the at least a subset of the two or more action events based on the geolocation of the user computing device when each of the two or more action events was detected by the user computing device;
    identifying, automatically by the one or more computing devices, a geolocation, previously not identified to the one or more computing devices, of a point of sale terminal based on the determined geolocation of the at least a subset of the two or more action events;
    receiving, by the one or more computing devices and from a second user computing device, a second action notification comprising a second action event, a second time for the second action event, and a second geolocation for the second action event;
    determining, by the one or more computing devices, that the second geolocation for the second action event corresponds to the identified location of the point-of-sale terminal; and
    in response to determining that the second geolocation for the second action event corresponds to the identified geolocation of the point of sale terminal, transmitting, by the one or more computing devices, content to the second user computing device.

2. The computer-implemented method of claim 1, wherein the non-sensory related action event comprises a change in a gift card account or loyalty account balance.

3. The computer-implemented method of claim 1, wherein the non-sensory related action event comprises a display of an offer, loyalty account information, or financial account information.

4. The computer-implemented method of claim 3, wherein the sensory related action event comprises a sound or image related to a point-of-sale terminal.

5. The computer-implemented method of claim 3, wherein the sensory related action event comprises a movement of the user computing device.

6. The computer-implemented method of claim 1, wherein the one or more computing devices analyzed action events and frequencies that correlate to point-of-sale terminal geolocations to create an artificial neural network or adaptive system model for identifying the pre-determined frequency threshold.

7. The method of claim 6, further comprising, updating, by the one or more computing devices, the artificial neural network or adaptive system model for identifying the pre-determined frequency threshold based on the two or more action events.

8. The computer-implemented method of claim 1, further comprising determining, by the one or more computing devices, a frequency of the at least a subset of the two or more action events based on the time for each of subset of the two or more action events.

9. The computer-implemented method of claim 1, further comprising determining, by the one or more computing devices, that the two or more action events comprise pre-determined action events classified for identifying point-of-sale terminal geolocations.

10. The computer-implemented method of claim 1, wherein the content transmitted to the second user computing device comprises one or more of an offer, loyalty account information, financial account information, gift card account information, and rewards, incentives for use during a payment transaction at the point-of-sale terminal.

11. A computer program product, comprising:
    a non-transitory computer-readable medium having computer-executable program instructions embodied therein that when executed by a computer cause the computer to identify point-of-sale terminal geolocations, the computer-executable program instructions comprising:
        computer-executable program instructions to receive, from a user computing device, an action notification comprising two or more action events, a time for each of the two or more action events, and a geolocation of the user computing device when each of the two or more action events was detected by the user computing device, the two or more action events comprising at least one sensory-related action event detected by hardware components of the user computing device and at least one non-sensory related action event detected by software components of the user computing device;

computer-executable program instructions to automatically determine that a frequency of at least a subset of the two or more action events meets or exceeds a pre-determined frequency threshold based on the time for each of subset of the two or more action events;

computer-executable program instructions to automatically determine a geolocation of the at least a subset of the two or more action events based on the geolocation of the user computing device when each of the two or more action events was detected by the user computing device; and computer-executable program instructions to automatically identify a geolocation, previously not identified to the computer, of a point of sale terminal based on the determined geolocation of the at least a subset of the two or more action events.

12. The computer program product of claim 11, further comprising:

computer-executable program instructions to receive, from a second user computing device, a second action notification comprising a second action event, a second time for the second action event, and a second geolocation for the second action event;

computer-executable program instructions to determine that the second geolocation for the second action event corresponds to the identified geolocation of the point-of-sale terminal; and computer-executable program instructions to content to the second user computing device.

13. The computer program product of claim 12, wherein the content transmitted to the second user computing device comprises one or more of an offer, loyalty account information, financial account information, gift card account information, and rewards, incentives for use during a payment transaction at the point-of-sale terminal.

14. The computer program product of claim 11, wherein the non-sensory related action event comprises a change in a gift card account or loyalty account balance.

15. The computer program product of claim 11, wherein the non-sensory related action event comprises a display of an offer, loyalty account information, or financial account information.

16. The computer program product of claim 11, wherein the sensory related action event comprises a sound or image of a point-of-sale terminal.

17. The computer program product of claim 11, wherein the sensory related action event comprises a movement of the user computing device.

18. A system to identify point-of-sale terminal geolocations, comprising:

a geolocation-enabled user computing device comprising:
 a user computing device storage device;
 at least one user computing device sensory hardware component; and
 a user computing device processor communicatively coupled to the user computing device storage device, wherein the user computing device processor executes application code instructions that are stored in the user computing device storage device to cause the user computing device to:
  automatically detect two or more action events, each of the two or more action events comprising a time for each of the two or more action events, and a geolocation of the user computing device when each of the two or more action events was detected by the user computing device, the two or more action events comprising at least one sensory-related action event detected by computing device sensory hardware component and at least one non-sensory related action event detected by processor of the user computing device, and
  transmit an action event notification comprising each of the two or more action events, the time for each of the two or more action events, and the geolocation of the user computing device when each of the two or more action events was detected by the user computing device to an account management system; and a server operated by the account management system, comprising:
 a storage device; and
 a processor communicatively coupled to the storage device, wherein the processor executes application code instructions that are stored in the storage device to cause the one or more computing devices operated by an account management system to:
  receive, from the user computing device, the action notification comprising the two or more action events, the time for each of the two or more action events, and the geolocation of the user computing device when each of the two or more action events was detected by the user computing device;
  automatically determine that a frequency of at least a subset of the two or more action events meets or exceeds a pre-determined frequency threshold based on the time for each of subset of the two or more action events;
  automatically determine a geolocation of the at least a subset of the two or more action events based on the geolocation of the user computing device when each of the two or more action events was detected by the user computing device; and
  automatically identify a geolocation, previously not identified to the server, of a point of sale terminal based on the determined geolocation of the at least a subset of the two or more action events.

19. The system of claim 18, further comprising a second user computing device, wherein the processor is further configured to execute computer-executable instructions stored in the storage device to cause the account management system to:

receive, from a second user computing device, a second action notification comprising a second action event, a second time for the second action event, and a second geolocation for the second action event;

determine that the second geolocation for the second action event corresponds to the identified geolocation of the point-of-sale terminal; and content to the second user computing device.

20. The system of claim 19, wherein the content transmitted to the second user computing device comprises one or more of an offer, loyalty account information, financial account information, gift card account information, and rewards, incentives for use during a payment transaction at the point-of-sale terminal.

21. The system of claim 18, wherein the non-sensory related action event comprises a display of an offer, loyalty account information, or financial account information.

22. The system of claim 21, wherein the user computing device sensory hardware component comprises a microphone and the sensory related action event comprises a sound of a point-of-sale terminal.

23. The system of claim 21, wherein the user computing device sensory hardware component comprises a camera and the sensory related action event comprises an image or video of a point-of-sale terminal.

24. The system of claim 21, wherein the user computing device sensory hardware component comprises an accelerometer and the sensory related action event comprises a movement of the user computing device.

* * * * *